(12) United States Patent
Ramagiri et al.

(10) Patent No.: US 11,550,720 B2
(45) Date of Patent: Jan. 10, 2023

(54) CONFIGURABLE CACHE COHERENCY CONTROLLER

(71) Applicant: Arm Limited, Cambridge (GB)

(72) Inventors: Gurunath Ramagiri, Austin, TX (US);
Jamshed Jalal, Austin, TX (US); Mark David Werkheiser, Austin, TX (US);
Tushar P Ringe, Austin, TX (US);
Mukesh Patel, Round Rock, TX (US);
Sakshi Verma, Austin, TX (US)

(73) Assignee: Arm Limited, Cambridge (GB)

( * ) Notice: Subject to any disclaimer, the term of this patent is extended or adjusted under 35 U.S.C. 154(b) by 71 days.

(21) Appl. No.: 17/102,997

(22) Filed: Nov. 24, 2020

(65) Prior Publication Data
US 2022/0164288 A1  May 26, 2022

(51) Int. Cl.
*G06F 12/0815* (2016.01)
*G06F 12/0831* (2016.01)

(52) U.S. Cl.
CPC ...... *G06F 12/0815* (2013.01); *G06F 12/0833* (2013.01); *G06F 2212/621* (2013.01)

(58) Field of Classification Search
None
See application file for complete search history.

(56) References Cited

U.S. PATENT DOCUMENTS

| | | | |
|---|---|---|---|
| 6,810,467 B1 | 10/2004 | Khare et al. | |
| 8,423,736 B2 | 4/2013 | Blake et al. | |
| 9,990,292 B2 | 6/2018 | Jalal et al. | |
| 10,042,766 B1 | 8/2018 | Ringe et al. | |
| 10,157,133 B2 | 12/2018 | Jalal et al. | |
| 10,310,979 B2 | 6/2019 | Jalal et al. | |
| 2003/0028819 A1 | 2/2003 | Chiu et al. | |
| 2003/0131202 A1 | 7/2003 | Khare et al. | |
| 2003/0140200 A1 | 7/2003 | Jamil et al. | |
| 2005/0005073 A1 | 1/2005 | Pruvost et al. | |
| 2005/0108717 A1* | 5/2005 | Hong | G06F 9/5033 718/102 |
| 2008/0005485 A1 | 1/2008 | Gilbert et al. | |
| 2008/0320233 A1 | 12/2008 | Kinter | |

(Continued)

OTHER PUBLICATIONS

A. Moshovos, G. Memik, B. Falsafi and A. Choudhary, "JETTY: filtering snoops for reduced energy consumption in SMP servers," Proceedings HPCA Seventh International Symposium on High-Performance Computer Architecture, Monterrey, 2001, pp. 85-96.

*Primary Examiner* — Kaushikkumar M Patel
(74) *Attorney, Agent, or Firm* — Leveque Intellectual Property Law, P.C.

(57) ABSTRACT

Entries in a cluster-to-caching agent map table of a data processing network identify one or more caching agents in a caching agent cluster. A snoop filter cache stores coherency information that includes coherency status information and a presence vector, where a bit position in the presence vector is associated with a caching agent cluster in the cluster-to-caching agent map table. In response to a data request, a presence vector in the snoop filter cache is accessed to identify a caching agent cluster and the map table is accessed to identify target caching agents for snoop messages. In order to reduce message traffic, snoop message are sent only to the identified targets.

20 Claims, 7 Drawing Sheets

(56) References Cited

U.S. PATENT DOCUMENTS

| | | | |
|---|---|---|---|
| 2009/0157962 A1* | 6/2009 | Gregg | G06F 12/0806 |
| | | | 711/E12.017 |
| 2012/0284732 A1* | 11/2012 | Griglock | G06F 9/5066 |
| | | | 718/104 |
| 2013/0042070 A1 | 2/2013 | Jalal et al. | |
| 2013/0042078 A1 | 2/2013 | Jalal et al. | |
| 2013/0132678 A1* | 5/2013 | Hosokawa | G06F 12/0806 |
| | | | 711/130 |
| 2014/0006714 A1* | 1/2014 | Cherukuri | G06F 12/0817 |
| | | | 711/128 |
| 2015/0127907 A1 | 5/2015 | Fahim et al. | |
| 2016/0147662 A1 | 5/2016 | Drapala et al. | |
| 2016/0188471 A1 | 6/2016 | Forrest et al. | |
| 2016/0342516 A1* | 11/2016 | Chang | G06F 12/1027 |
| 2017/0185518 A1* | 6/2017 | Guim Bernet | G06F 12/0817 |
| 2019/0188137 A1* | 6/2019 | Kalyanasundharam | |
| | | | G06F 12/0811 |
| 2021/0357334 A1* | 11/2021 | Dropps | G06F 12/0817 |

\* cited by examiner

CONFIGURABLE CACHE COHERENCY CONTROLLER

BACKGROUND

In a data processing network, a data storage device may be shared between a number of network devices or agents, such as central processing units (CPUs) or accelerator units. Some network agents, referred to herein as caching agents, are able to store copies of data in local caches. In order to maintain data coherency, a coherency controller sends messages, called snoop messages, to the agents when a coherency state of the data changes.

The number of snoop messages that need to be sent, in order to maintain coherency, may be reduced by using a snoop filter. The snoop filter keeps a record of which agents may have copies of data and the coherency controller sends snoop messages to the those agents only. The record is stored in a snoop filter cache.

In a data processing network with a large number of agents and/or large capacity data storage device, it becomes impractical, or too expensive, to provide a snoop filter cache large enough to track all data and all caching agents.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding or analogous elements.

DETAILED DESCRIPTION

The various apparatus and devices described herein provide mechanisms for maintaining data coherency in a data processing network having a shared data resource.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As used herein, the term "configured to", when applied to an element, means that that the element may be designed or constructed to perform a designated function, or has the required structure to enable it to be reconfigured or adapted to perform that function.

Data Processing Network

Figure 1:
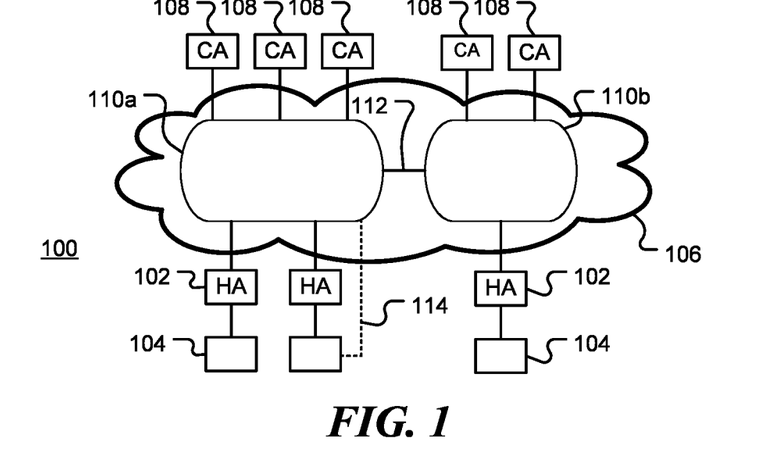
FIG. 1 is a block diagram of a data processing network, in accordance with various representative embodiments.

FIG. 1 is a block diagram of a data processing network 100, in accordance with various representative embodiments. The network 100 may be implemented in a System-on-a-Chip (SoC) integrated circuit, a multi-chip network, a network of local devices, a network of remote devices or a combination thereof. In the simplified example shown, network 100 includes a number of functional blocks that are operationally connected together via a network interconnect. The functional blocks are referred to herein as 'nodes' or 'agents'. In the network 100, data may be accessed by multiple agents. In order to ensure that data remains coherent throughout the network, nodes 102 are data handlers that serve as 'homes' for blocks of data associated with a set of data addresses in an associated data store 104. These nodes are referred to herein as 'home agents' (HAs). A network node wishing to access data associated with a data address first determines which home agent is responsible for the address and then sends a message to that home agent. The home agent responds to data transactions from other network nodes and, in responding, may perform data transactions with other functional blocks, such as a memory controller or an I/O device. A data processing network may contain any number of home agents 102, each responsible for a set of data addresses in one or more data resources and acting as a point of serialization and coherency for those data addresses.

Home agents 102 are operationally coupled to other network nodes via network interconnect 106. In particular, network interconnect 106 enables messages and data to be passed between the home agents 102 and caching agents 108. A caching agent (CA) is a network node that includes a local cache for storing copies of data from shared data stores 104. A caching agent (CA) may be, for example, a central processing unit (CPU) or a hardware accelerator such as graphics processing unit (GPU) or digital signal processor (DSP) or other device. Network interconnect 106 may contain a combination of intra-chip links, 110a and 110b, and inter-chip links 112, using protocols such as a cache-coherent interconnect (CCIX) or compute express link (CXL) network. Network 106 may contain wired links, wireless links or a combination thereof. Data processing network 100 may include local nodes, remote nodes or a combination thereof. Shared data stores 104 may be coupled to network interconnect 106 via a home agent or directly via link 114, for example.

Data stores 104 may be operationally coupled to a designated home agent and/or to network interconnect 106.

It is noted that many elements of the network have been omitted in FIG. 1 for the sake of clarity. Further, a data processing network may be implemented on one or more integrated circuits or devices and may contain any number of home agents, memory resources and caching agents. For example, a network may contain 512 caching agents.

Coherency

Cache coherency is an issue in any system that contains one or more caches and multiple devices that share data. There are two potential problems with a system that contains caches. Firstly, memory may be updated (by another device) after a cached device has taken a copy. At this point, the data within the cache is out-of-date or invalid and no longer contains the most up-to-date data. Secondly, a device can update a local cached copy of data, at which point the memory no longer contains the most up-to-date data. A second device reading memory will see out-of-date or stale data. To avoid these problems, cache coherency is maintained in a home agent through use of a snoop filter.

In order to maintain coherency of data in the various local caches, the coherency state of each cache line or block is tracked. For example, data in a local cache is designated as being in a 'dirty' state if it the most up-to-date but does not match the data in the memory or lowest level cache. Otherwise, the data is said to be 'clean'. A cache coherence protocol may employ a MOESI cache coherence model, in which the cache data may be in one of a number of coherency states. The coherency states are: Modified (M), Owned (O), Exclusive (E), Shared (S) and Invalid (I).

Modified data, also called 'UniqueDirty' (UD) data, is not shared by other caches. Modified data in a local cache has been updated by a device, but has not been written back to memory, so it is 'dirty'. Modified data is exclusive and owned. The local cache has the only valid copy of the data.

Owned data, also called 'SharedDirty' (SD) data, is shared by other caches. It has not been written back to memory so it is 'dirty'.

Exclusive data, also called 'UniqueClean' (UC) data, is not shared and matches the corresponding data in the memory.

Shared data, also called 'SharedClean' (SC) data, is shared and matches the corresponding data in the memory. Shared data is not exclusive, not dirty, and not owned.

Invalid data is data that has be updated in the memory and/or in another cache, so is out-of-date. Valid data is the most up-to-date data. It may be read but it may only be written if it also exclusive.

Alternatively, a cache coherence protocol may employ a MESI cache coherence model. This is similar to the MOESI model except that data cannot be in the 'Owned' or 'Shared-Dirty' state.

Figure 2:
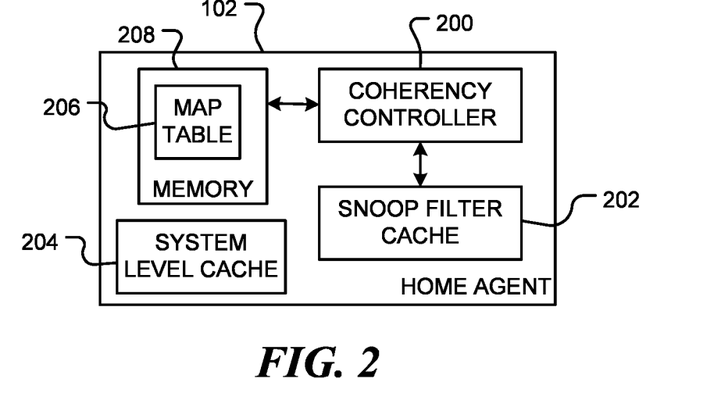
FIG. 2 is a block diagram of a home agent, in accordance with various representative embodiments.

FIG. 2 is a block diagram of a home agent 102 in accordance with embodiments of the disclosure. Home agent 102 maintains data coherency is a data processing network through use of a coherency controller 200 and stores information related to cached data in snoop filter cache 202.

Home agent 102 may also include a system level cache (SLC) 204, which may be referred to herein as a level 3 (L3) cache. However caches at other levels may be used. For example, in a system with multiple caches, SLC 204 may be a lowest or last level cache (LLC). Data from a data store associated with the home agent may be cached in SLC 204 to provide faster access to the data.

To avoid excessive exchange of messages between the caching agents and the home agents, coherency controller 200 of home agent 102 monitors data transactions and record which caching agents have accessed which data address. Transaction and coherency status is recorded in snoop filter cache 202. The home agent acts as a point of coherence in that it issues coherence responses and receives coherence requests via the network interconnect from caching agents. The home agent is an intermediate node in that it responds to data transaction requests from a caching agent and can issue data transaction requests, including snoop messages, to other devices (such as a memory controller). Since memory accesses, for a given set of memory addresses in a shared data resource, pass through the same home agent, the home agent can monitor or 'snoop' on transactions and determine if requested data should be retrieved from a main memory, from a cache in the home agent, or from a local cache of one of the caching agents.

In alternative embodiments, one or more snoop filters may be utilized at other locations in a system. For example, a snoop filter may be located in a network interconnect In order to maintain data coherency, the home agent sends messages, called snoop messages, to the caching agents whenever a coherency state of the data changes. Maintaining a snoop filter cache reduces the number of a snoop message to be sent. The snoop filter keeps a record of which caching agents may have copies of the data and sends snoop messages to those caching agents only. The record is stored in snoop filter cache 202.

Figure 3:
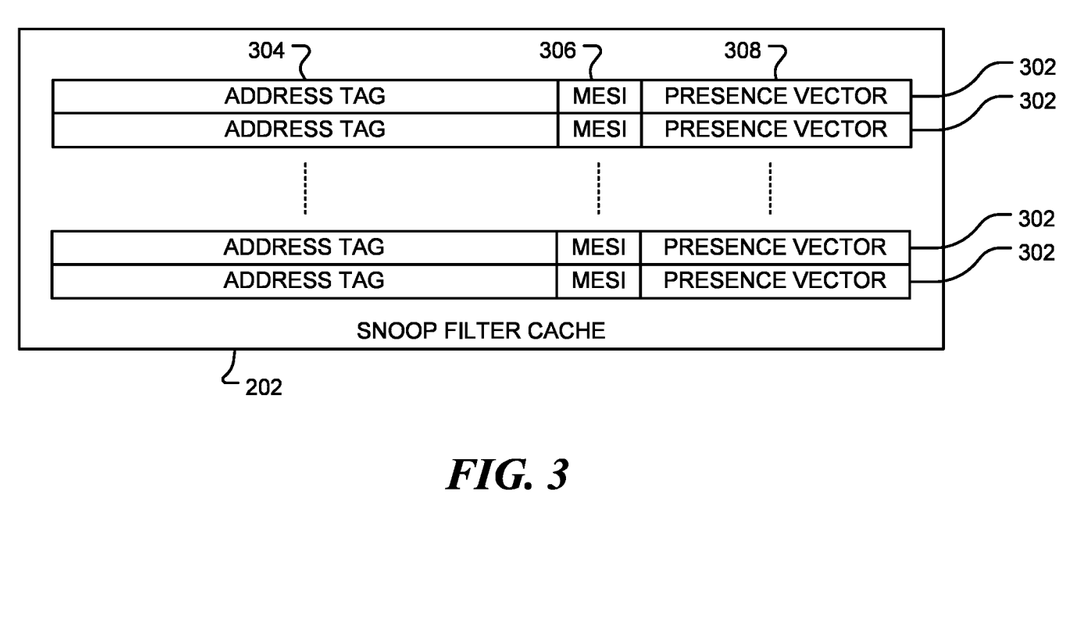
FIG. 3 is a block diagram of a snoop filter cache, in accordance with various representative embodiments.

Home Agent 102 also includes a map table 206 stored memory 208. These elements are discussed below Snoop Filter Cache FIG. 3 is a block diagram of a snoop filter cache 202. The coherency controller accesses the snoop filter cache in order to identify which cache agents are targets for snoop messages. A snoop message may be directed (unicast) to a particular caching agent, multicast to a subset of caching agents, or broadcast to all of the caching agents. A snoop message may be a request for data associated with a particular address. Such a snoop message may be referred to simply as a 'snoop'. The snoop filter cache 202 contains a number of entries 302 associated with cached data in the network. Each entry 302 records an address tag 304, which identifies the associated data, a cache coherence status 306, which indicates the coherency state of the data, and a presence or tracking vector 308. In a network that follows MESI cache coherence model, for example, the state of the cached data may be Modified (M), Exclusive (E), Shared (S), or Invalid (I). Other cache coherence models may be used. For a fine grain snoop filter, each bit in the presence vector corresponds to a single node or caching agent. A bit is set in the presence vector 308 if a corresponding caching agent has a copy of data associated with the address tag 304 in its local cache. Each bit position is an indirect reference to the caching agent. For example, a bit position may acts as a pointer to a table of caching agent identifiers. This enables the coherency controller to avoid sending snoop messages to caching agents that don't have a copy of the data, thereby reducing snoop message traffic.

Large Scale Systems

In large scale data processing networks, with many caching agents across multiple chips or devices, data and instruction coherency may be maintained across all the caching agents using multiple levels of cache and a snoop filter hierarchy. The snoop filter cache records the cache lines accessed by each caching agent, so that any subsequent access to cached data by another caching agent can be identified and used for coherency resolution. Each level of the cache/snoop filter hierarchy acts as an aggregation layer for the caches before it. For example, multiple private level one (L1) data and instruction caches are tracked at the shared level two (L2) snoop filter. If the L2 cache is private to each agent, then the tracking is done at shared level three (L3) snoop filter and so on. At the level of the system level cache (SLC), the snoop filter tracks all the cache lines in the lowest level cache (LLC), e.g. L3 and below.

When scaling to large multi-chip systems with lots of caching agents, adding more hierarchy levels leads to increased latency and impacts overall throughput of the system. However, when fewer layers of hierarchy are used, tracking multiple caching agents for each cache line entry in the snoop filter becomes challenging. This tracking may be implemented using an actual device identifier for each caching agent, which requires more storage than a single bit unique identifier or a logical identifier indirection. For example, in a system that tracks 512 caching agents, it may not be practical or economical to store each caching agent's identifier in each cache line entry. Even with a logical identifier indirection for each caching agent, a 512-bit tracking vector is required for each cache line.

Thus, in a data processing network with a large number of agents and/or a large capacity shared storage device, it may become impractical or too expensive to provide a snoop filter cache with sufficient capacity.

Clustering

An embodiment of the present disclosure enables a snoop filter cache of a given size to track an increased number of caching agents and/or memory locations by providing a user configurable clustering of caching agents. Coherency information in the snoop filter cache may be maintained on a 'per-cluster' or 'coarse grain' basis as compared to a 'per-caching-agent' or 'precise' basis. Configurable clustering of caching agents enables a variable number of caching agent to be grouped in each cluster, allowing fine-grained and coarse-grained tracking of agents simultaneously.

For a coarse grain snoop filter, a bit in the presence vector of a snoop filter cache entry corresponds to a designated cluster of two or more caching agents. Here, a 'cluster' refers to logical cluster of caching agents and may be any subset of nodes—whether physically clustered or not. A bit is set in the presence vector if one or more caching agents in the corresponding cluster have a copy of the data in their local cache. Thus, a bit in a presence vector is an indirect reference to a cluster of caching agents and is de-referenced, using a map table, to identify the associated caching agents. For a given number of caching agents, a coarse grain filter requires less storage but may result in more snoop messages than necessary. However, since no snoop messages are sent to a cluster of caching agents if none of them has a copy of the requested data, the number of snoop messages is greatly reduced compared to a system with no snoop filter or a full broadcast.

A further embodiment provides different clustering of caching agents in different storage regions. This enables optimization for precise or fine-grained tracking of caching agents and provides improved snoop filter scaling. In turn, this reduces the need for broadcasting snoop messages and reduces the number of unnecessary snoop messages.

In an embodiment of the disclosure, a bit in the presence vector is associated with a cluster of caching agents. Referring again to FIG. 2, a programmable cluster-to-caching agent (cluster-to-CA) map table 206 is stored in memory 208 of the home agent 102. Cluster-to-CA map table 206 contains a number of logical columns, each associating a bit-position in a presence vector of the snoop filter cache with a caching agent cluster containing one or more caching agents. The presence vector for a particular data address identifies which cluster to send messages to, while the cluster-to-CA map table 206 identifies which caching agents are in those clusters.

Thus, in one embodiment, each bit in a snoop filter tracking vector is associated with a cluster of caching agents. The number of caching agents, their identities, and how they are clustered is configurable. Configuration may be implemented using programmable registers, for example. This enables the snoop filter to be scaled for large multi-chip systems. In addition, configuration allows local and remote caching agents to be in the same cluster, if desired.

Figure 4:
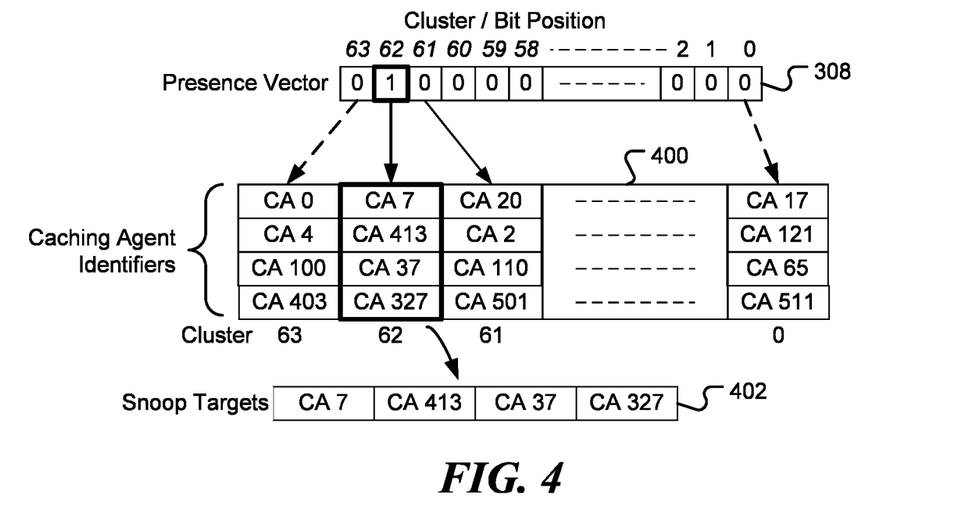
FIG. 4 is a diagrammatic representation of an example cluster-to-agent map table, in accordance with in accordance with various representative embodiments.

FIG. 4 is a diagrammatic representation of an example cluster-to-CA map table 400 in accordance with embodiments of the disclosure. Map table 400 is a shared resource for all entries in the snoop filter cache. Each logical column of map table 400 identifies caching agents in a logical cluster of caching agents and each logical column is associated with a single bit in a presence vector of a snoop filter cache. The mapping of each bit to the corresponding caching agents is programmable, such that any caching agents can be mapped to any cluster. In this example, the presence vector contains 64 bits, but presence vectors of other lengths may be used.

In the example shown in FIG. 4, bit position 63 in presence vector 308 is associated with a cluster containing caching agents with identifiers CA_0, CA_4, CA_100 and CA_403, while bit position 0 in presence vector 308 is associated with caching agents with identifiers CA_17, CA_121, CA_65 and CA_511. In this example, each cluster contains up to four caching agents, so a presence vector of length n-bits can track up to 4n caching agents. For example, in a data processing network with 512 caching agents and a 128-bit snoop filter tracking vector, each bit in snoop filter tracking vector may be configured to represent a cluster of four caching agents. In general, a cluster may contain any number of caching agents.

An access to a shared cache line will cause snoop messages to be sent to all four caching agents in a cluster if any of them has accessed it. In the example shown in FIG. 4, bit position 62 in presence vector 308 is set. This indicates that at least one of the caching agents with identifiers CA_7, CA_413, CA_37 and CA_327 has accessed the data and may be target for a snoop message. These caching agents are selected as a set 402 of caching agents to be potential snoop targets.

When a cache line is accessed, the bit corresponding to the cluster ID in the snoop filter is set to 1. Any subsequent accesses to this cache line will access the snoop filter cache and identify which cluster ID's have the bit set. If the access requires snooping of the caching agents, then all the caching agents to be snooped are identified from the map table based on the cluster ID's.

When a cluster contains a single caching agent, the presence vector can be updated when that caching agent evicts the data from its cache. However, when a cluster contains multiple caching agents, the presence vector does not indicate how many of the caching agents have copies of the data at a particular address. Thus, the presence vector is not updated when a single caching agent evicts the data from its cache. However, a bit in the presence vector may be reset to zero, for example, upon snoop filter eviction of the data and invalidation of the data at all of the caching agents in the cluster.

In an embodiment of the disclosure, clusters may contain different numbers of caching agents, with some clusters containing only a single caching agent and others containing multiple caching agents. This enables at least some caching agents to be tracked precisely. The cluster-to-CA map may be programmed, for example, to enable caching agents with high utilization to be tracked precisely.

Simultaneous Precise and Imprecise Tracking:

Embodiments of the disclosure use clustering of caching agents in a snoop filter to track caching agents dynamically. This provides both precise and imprecise tracking while improving the overall snoop filter efficiency and scalability for large systems. The clustering depth and grouping of caching agents is configurable to allow precise tracking for data shared by up to n caching agents. Both precise and imprecise tracking can be provided at the same time in a single snoop filter. In addition different clustering can be used for different storage regions.

Figure 5:
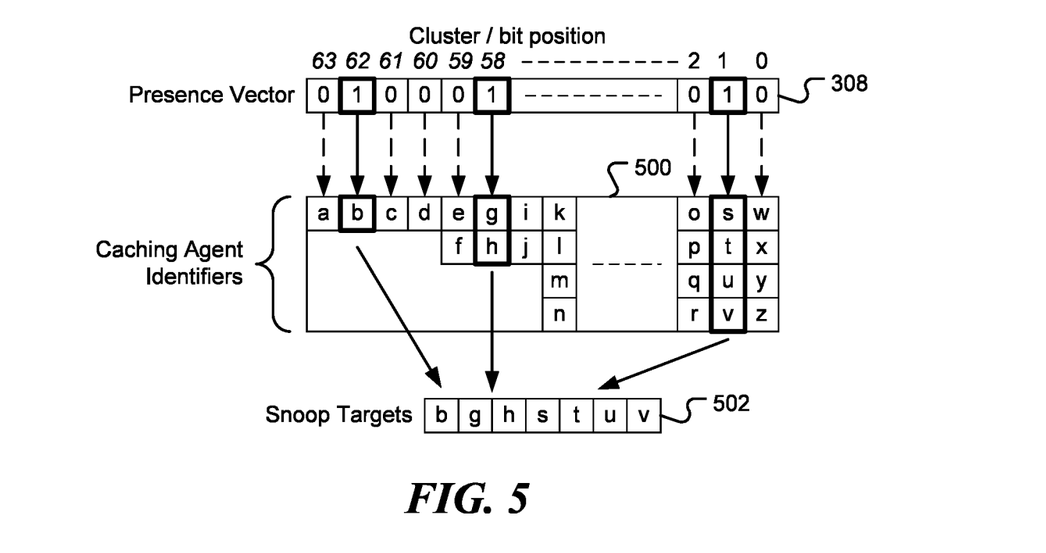
FIG. 5 is a diagrammatic representation of an example cluster-to-agent map table, in accordance with in accordance with various representative embodiments.

FIG. 5 is a diagrammatic representation of an example cluster-to-CA map table 500, in accordance with embodiments of the disclosure. In this example, the table is configured such that number of caching agents is not the same for all clusters. For example, bit positions 63, 62, 61 and 60 are each associated with a single caching agent. This enables these caching agents to be tracked precisely. Bit positions 59 and 58 are each associated with two caching and bit positions 2, 1 and 0 are each associated with four caching agents. These caching agents are tracked imprecisely. In the example shown in FIG. 5, bits at positions 62, 58 and 1 in presence vector 308 are set. This indicates that caching agent b, at least one of caching agents g and h, and at least one of caching agents s, t, u and v have accessed the data and are potential targets for a snoop message. These caching agents are selected as a set 502 of caching agents to be potential snoop targets.

This approach enables selective grouping of caching agents in the clusters, and provides an ability to combine precise and imprecise tracking. A benefit of this approach is that remote caching agents can be tracked precisely, reducing snoop message latency due to broadcast or multicast messages. For example, cluster-to-CA map table 500 enables caching agents located on a different chip to the home agent to be tracked precisely, thereby reducing the number of snoop messages crossing the chip boundaries. This flexibility also enables, for example, remote agents to be tracked imprecisely, in clusters, while local caching agents are tracked precisely.

Cluster-to-CA map table 500 may be programmed at boot time, for example.

Method of Operation.

Figure 6:
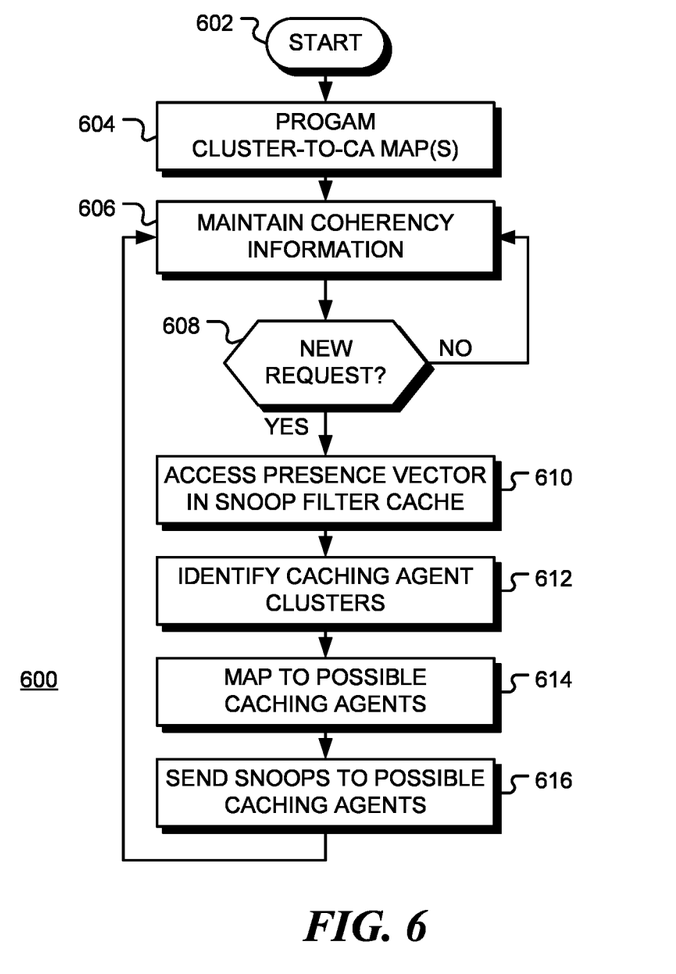
FIG. 6 is a flow chart of a method of operation of a data processing network, in accordance with various representative embodiments.

FIG. 6 is a flow chart of a method 600 of operation of a data processing network in accordance with embodiments of the disclosure. Following start block 602, a cluster-to-CA map table is programmed at block 604. Each entry of the cluster-to-CA map table identifies one or more caching agents in a caching agent cluster and is associated with a bit-position in a presence vector of a snoop filter cache. At block 606, coherency information is maintained in the snoop filter cache for data moved between one or more caches of caching agents of data processing network and a data storage device shared by the caching agents. As described above, each entry in the snoop filter cache is identified by an address tag of the data and stores coherency information for the data. The coherency information includes coherency status information and a presence vector.

When a request message is received at a home agent from a caching agent, as depicted by the positive branch from decision block 608, a presence vector in the snoop filter cache is accessed at block 610. An address tag of the address in the data storage device, referenced by the received message, is used to identify an entry in the snoop filter cache and the presence vector of that entry is accessed. From the accessed presence vector, one or more caching agent clusters are identified at block 612. At block 614, a set of target caching agents in the one or more caching agent clusters is identified using the cluster-to-CA map table. At block 616, snoop messages are sent to the set of target caching agents to maintain data coherency in the data processing network for data associated with the data storage device. In this way, the number of snoop messages needed is reduced, since no messages are sent to caching agents that are in a cluster for which the associated bit in the presence vector is not set. Flow continues to block 606.

Storage region aware precise tracking through clustered snoop filter. The clustering of caching agents is a logical clustering. Thus, different clustering maps may be used for different storage regions in the data store. In systems where some caching agents do not access a designated storage region, those caching agents do not need to be included in any of the clusters for that storage region. This allows for smaller clusters and, in turn, fewer snoop messages. It also allows more caching agents to be tracked precisely. For each storage region, the presence vector is associated with a different set of caching agent clusters.

In one embodiment, when a set of caching agents access non-overlapping storage regions, they can all be associated with the same bit in the presence vector. This enables the set of caching agents to be tracked precisely using a single bit in the presence vector. When a request message is received at the home agent, the data address referenced by the message is used to determine which storage region is affected, and the cluster-to-CA map for the storage region is used.

The storage regions may be selected to increase the number of caching agents accessing non-overlapping storage regions.

For example, in a system with four separate storage regions (0, 1, 2 and 3) and each storage region only being accessed by 128 caching agents, all 512 caching agents 512 agents and can be tracked precisely using a 128-bit presence vector. One or more additional bits in the presence vector may be mapped to clusters containing all of the caching agents not expected to access the region. In the event of an unexpected access, this cluster would be identified as potential snoop targets for coherency resolution.

The cluster-to-CA map table for each storage region may be programmed prior to normal operation.

Figure 7:
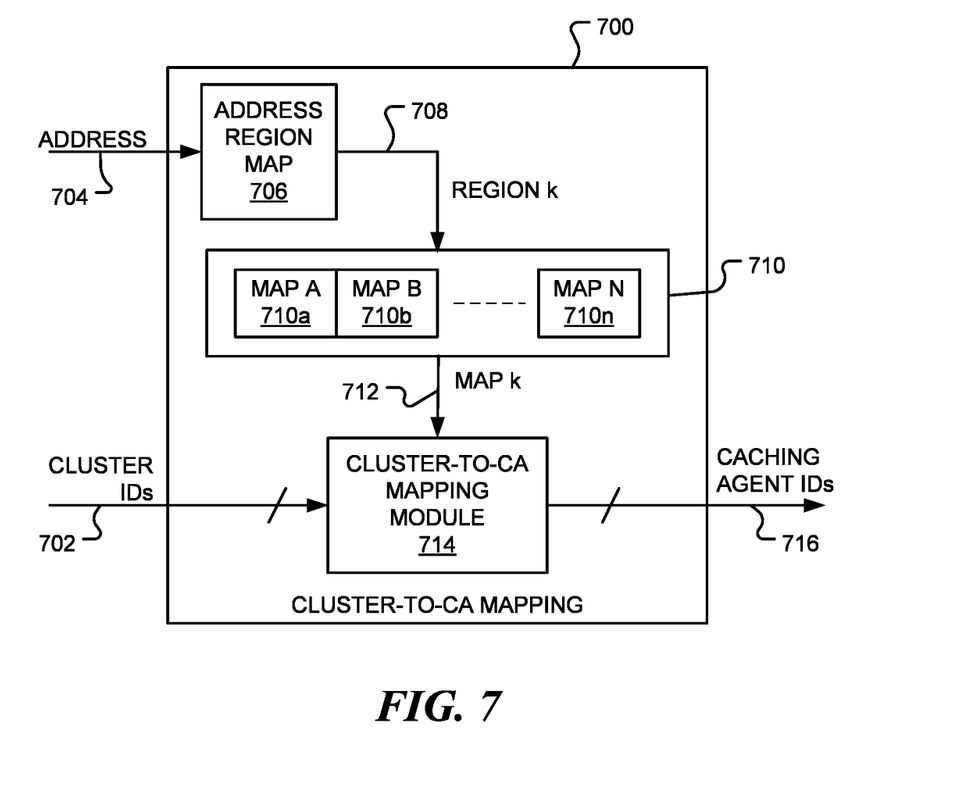
FIG. 7 is a block diagram of a mapping module for caching agent clusters, in accordance with various representative embodiments.

FIG. 7 is a block diagram of a cluster-to-CA mapping module 700 in accordance with various embodiments. Mapping module 700 receives, as inputs, cluster IDs 702 (corresponding to 'set' bits in a presence vector) and an address 704. The address is used to access address region map 706 to identify the storage region 708 that contains the address. The storage region is, in turn, used to select a cluster-to-CA map from a collection of maps 710. In the example shown, the collection of maps 710 includes maps 710a . . . 710n. Any number of storage regions may be used. The storage regions may have different sizes or the same size. The storage regions may be in a single storage device or multiple storage devices. The selected cluster-to-CA map 712 is used by cluster-to-CA mapping module 714 to identify the set 716 of caching agents that are potential targets for snoop messages. Thus, the set caching agents is identified by determining a storage region containing the address in the data storage device and mapping the one or more caching agent clusters to the set of caching agents using the cluster-to-CA map table for the determined storage region.

In the example shown in FIG. 7, the map table for a storage region is selected then accessed using clusters ID. In general, a storage region ID and cluster ID are used together to access the cluster information. These may be used in any order or in parallel. For example, a cluster ID may be used to identify a set of clusters and then the storage region ID used to select between the clusters.

Figure 8:
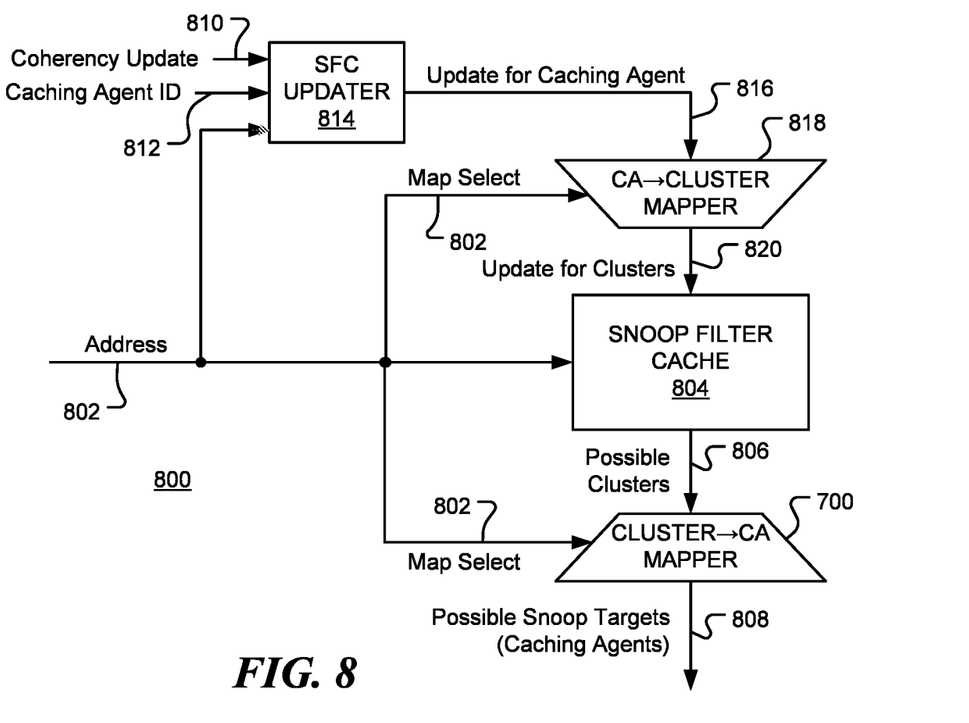
FIG. 8 is a block diagram of a snoop filter of a home agent in accordance with various representative embodiments.

FIG. 8 is a block diagram of a snoop filter 800 of a home agent in accordance with various embodiments. The snoop filter receives an address 802 that is used to access an entry in snoop filter cache 804. The entry identifies a set 806 of possible caching agent clusters to be snooped. The set of clusters is mapped to a corresponding set of caching agents in cluster-to-CA mapper 700. As discussed above, the cluster-to-CA mapper 700 may select the map table associated with the storage region containing address 802.

An entry in snoop filter cache (SFC) for address 802 is updated in response to updated coherency information 810 for a caching agent with caching agent ID 812 in SFC updater 814. This provides an update 816 for one more caching agents. Caching agent-to-cluster (CA-to-cluster) mapper 818 identifies which cluster contains the caching agent with ID 812 and provides update 820 for the bit position corresponding to that cluster. This identification uses the map table designated for the storage region containing the address 802. It is noted that, for the same caching agent, a different bit position in a presence vector may be updated, depending upon which storage region contains the address 802. It is also noted that a cluster may contain a single caching agent or multiple caching agents. Thus, for example, if coherency update 810 relates to invalidation of data at a caching agent in a cluster containing more than one caching agent, the presence vector may not be updated, since it is not known if the data is still valid at another agent in the same cluster.

Figure 9:
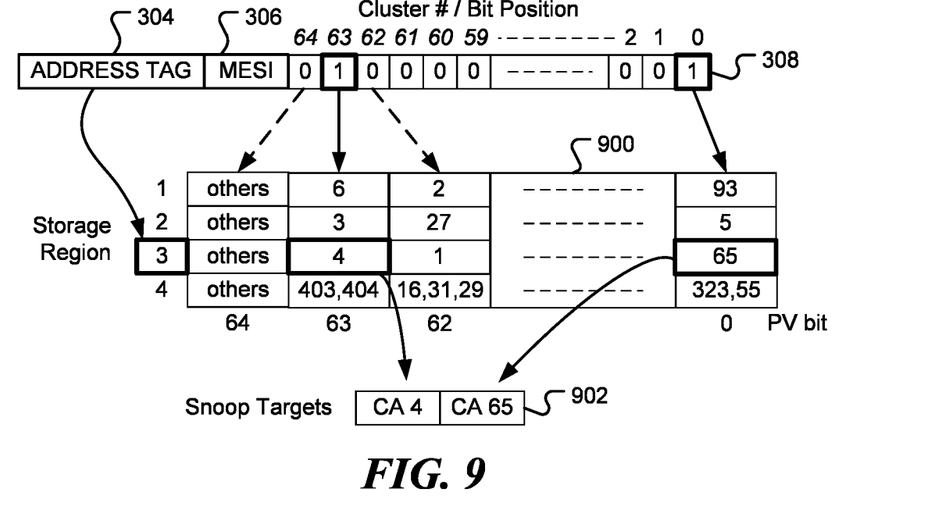
FIG. 9 is a diagrammatic representation of target caching agent selection from a presence vector field of a snoop filter cache entry, in accordance with various representative embodiments.

FIG. 9 is a diagram illustrating target caching agent selection from a presence vector field 308 of a snoop filter cache entry, in accordance with various representative embodiments. In this example, the caching agents access four storage regions of a data store controlled by the home agent. Cluster-to-CA map table 900 contains a logical column for each of the bits in presence vector field 308 (65 bits in this example). Each entry in a column contains a list of caching agents for a corresponding storage region. For example, the entry for bit position 62 and storage region 2 indicates a cluster containing the single caching agent with identifier '27'. Bit position 64 and storage region 1 indicates a cluster containing the all of the caching agents not designated as having access to storage region 1. Bit position 0 and storage region 4 indicates a cluster containing caching agents with identifiers '323' and '55'.

When a request is made to access the line the address in field 304, the presence vector in field 308 accessed. If the address is in region 3 and bits 63 and 0 are set (as shown), table 900 is accessed and identifies caching agents 4 and 65 as snoop targets 902.

Use of storage region dependent clustering enables more clusters to contain a single caching agent, enabling precise tracking with a smaller snoop filter cache.

Figure 10:
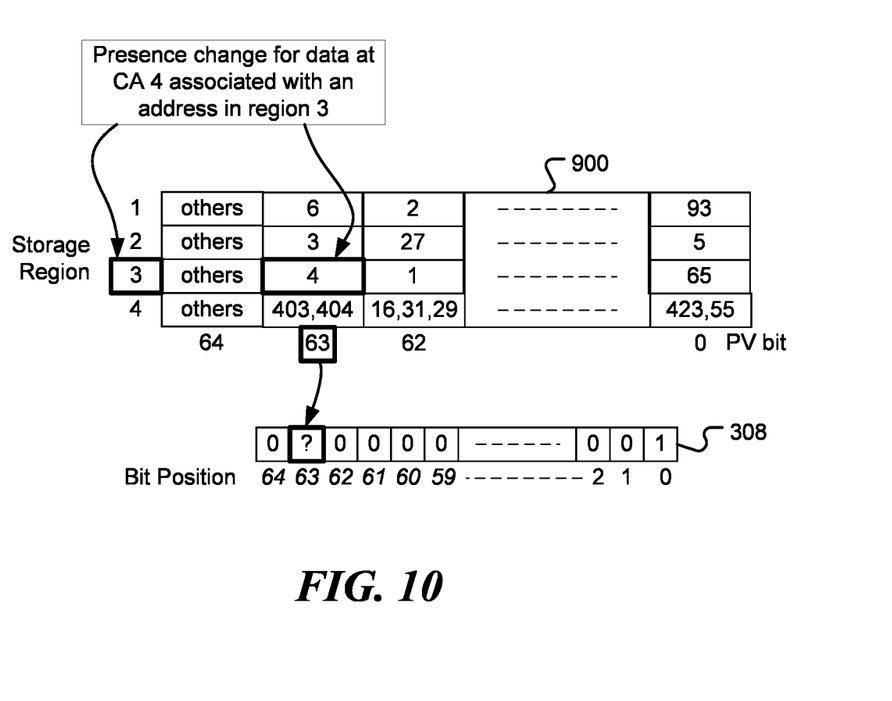
FIG. 10 is a diagrammatic representation of presence vector bit update, in accordance with various representative embodiments.

FIG. 10 is a diagram illustrating selection of a presence vector bit position, in accordance with various representative embodiments. When there is a change in presence, at a caching agent, of data associated with an address the associated presence vector in the snoop filter cache may need to be updated. Based on the address, the coherency controller identifies a line of the snoop filter cache, identifies a caching agent cluster that contains the first caching agent and, if necessary, updates a bit in the presence vector of the line. Identification of the caching agent cluster is performed as shown in FIG. 10. The storage region (3' in the example shown) containing the address is used to select a logical row of map table 900 and row is searched to find the cluster containing the caching agent identifier ('4' in the example shown). The map may be stored in a content addressable memory (CAM), for example, to allow rapid searching. In an alternative embodiment, an inverse map table (CA-to-cluster) may be provided. In the example shown in FIG. 10, the caching agent identifier is found in the column corresponding to bit position (cluster ID) 63, indicating that the corresponding bit in position vector 308 may need to be updated.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Dedicated or reconfigurable hardware components used to implement the disclosed mechanisms may be described, for example, by instructions of a hardware description language (HDL), such as VHDL, Verilog or RTL (Register Transfer Language), or by a netlist of components and connectivity. The instructions may be at a functional level or a logical level or a combination thereof. The instructions or netlist may be input to an automated design or fabrication process (sometimes referred to as high-level synthesis) that interprets the instructions and creates digital hardware that implements the described functionality or logic.

The HDL instructions or the netlist may be stored on non-transient computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added or operations can be deleted without departing from the present disclosure. Such variations are contemplated and considered equivalent.

Accordingly, some of the disclosed embodiments are set out in the following paragraphs.

One embodiment is a method comprising: programming a plurality of entries of a cluster-to-caching agent (cluster-to-CA) map table in a data processing network having a plurality of caching agents, each entry identifying one or more caching agents in a caching agent cluster; storing, in a snoop filter cache of the data processing network, coherency information associated with data moved between one or more caches of the plurality of caching agents and a data storage device shared by the plurality of caching agents, the coherency information for the data including coherency status information and a presence vector identified by an address tag of the data, where a bit position in the presence vector is associated with a caching agent cluster in the cluster-to-CA map table; responsive to receiving a message from a caching agent of the plurality of caching agents, the message designating an address in the data storage device: accessing a presence vector in the snoop filter cache identified by a first address tag corresponding to the designated address in the data storage device; identifying, from the accessed presence vector, one or more caching agent clusters; determining, based on the cluster-to-CA map table, a set of target caching agents in the identified one or more caching agent clusters; and sending snoop messages to the set of target caching agents to maintain data coherency in the data processing network for data associated with the data storage device.

A further embodiment a method, where one or more of the caching agent clusters in the cluster-to-CA map table consists of a single caching agent and one or more of the caching agent clusters in the cluster-to-CA map table include more than one caching agent.

Another embodiment is a method, where a bit position in the presence vector is associated with a plurality of caching agent clusters and each of the plurality of caching agent clusters is associated with a designated storage region of the data storage device.

Another embodiment is a method, where said determining the set of target caching agents is further based on the address in the data storage device and the set of target caching agents includes only caching agents with access to the address in the data storage.

A further embodiment is a method, further comprising programming a cluster-to-CA map table for each of a plurality of storage regions of the data storage device, where said determining the set of target caching agents includes: determining a storage region of the data storage device that contains the designated address; and mapping the one or more caching agent clusters to the set of target caching agents using the cluster-to-CA map table for the determined storage region.

Another embodiment is a method, where a caching agent with access to a first storage region of the plurality of storage regions is contained in a caching agent cluster consisting of a single caching agent in a cluster-to-CA map table for the first storage region.

Another embodiment is a method comprising: storing, in a snoop filter cache of a data processing network, coherency information associated with data moved between one or more caches of a plurality of caching agents of the data processing network and a data storage device shared by the plurality of caching agents, the coherency information for the data including coherency status information and a presence vector identified by an address tag of the data, where a bit position in the presence vector is associated with a caching agent cluster containing one or more caching agents; responsive to a change in presence, at a first caching agent of the plurality of caching agents, of data associated with an address: identifying, based on the address, a line of the snoop filter cache; identifying a caching agent cluster that contains the first caching agent; and updating a bit in a presence vector of the line associated with the identified caching agent cluster in accordance with the change in presence of the data.

A further embodiment is a method, further comprising: programming an caching agent-to-cluster (CA-to-cluster) map table identifying, for each caching agent of the plurality of caching agents, a caching agent cluster containing that caching agent, where said identifying the caching agent cluster that contains the first caching agent includes accessing the CA-to-cluster map table.

Another embodiment is an apparatus comprising: a coherency controller configured to access a data storage device; a plurality of caching agents of a data processing network, each caching agent having at least one cache and configured to access the data storage device via the coherency controller; a snoop filter cache accessible by the coherency controller, the coherency controller configured to maintain coherency information in the snoop filter cache for data moved between one or more caches of a plurality of caching agents of data processing network and a data storage device shared by the plurality of caching agents, the coherency information for the data including coherency status information and a presence vector identified by an address tag of the data, where a bit position in the presence vector is associated with a caching agent cluster in a cluster-to-CA map table; a memory, accessible by the coherency controller and programmed to store the cluster-to-CA map table, an entry in the cluster-to-CA map table identifying one or more caching agents in a caching agent cluster; where the coherency controller is further configured to: receive a message from a caching agent of the plurality of caching agents, the message associated with an address in the data storage device; access a presence vector in the snoop filter cache identified by a first address tag corresponding to the designated address in the data storage device; identify, from the accessed presence vector, one or more caching agent clusters; determine, based on the cluster-to-CA map table, a set of target caching agents in the identified one or more caching agent clusters; and send snoop messages to the set of target caching agents to maintain data coherency in the data processing network for data associated with the data storage device.

A further embodiment is an apparatus, further comprising the data storage device.

Another embodiment is an apparatus, where the coherency controller and the plurality of caching agents are operatively coupled via a wired or wireless network.

Another embodiment is an apparatus, where a bit position in the presence vector is associated with a plurality of caching agent clusters and each of the plurality of caching agent clusters is associated with a designated storage region of the data storage device.

A further embodiment is an apparatus, where the coherency controller is configured to determine the set of target caching agents based on the address in the data storage device and the set of target caching agents includes only caching agents with access to the address in the data storage.

A further embodiment is an apparatus, where the memory is configured to store a cluster-to-CA map table for each of a plurality of storage regions of the data storage device, where the coherency controller is configured to determine the set of target caching agents by: determining a storage region of the data storage device that contains the designated address; and mapping the one or more caching agent clusters to the set of target caching agents using the cluster-to-CA map table for the determined storage region.

Another embodiment is an apparatus described above, where a caching agent with access to a first storage region of the plurality of storage regions is contained in a caching agent cluster consisting of a single caching agent in a cluster-to-CA map table for the first storage region.

A further embodiment is an apparatus, where the coherency controller is further configured to: detect a change in presence, at a first caching agent of the plurality of caching agents, of data associated with an address; identify, based on the address, a line of the snoop filter cache; identify a caching agent cluster that contains the first caching agent; and updating a bit in a presence vector of the line associated with the identified caching agent cluster in accordance with the change in presence of the data.

Another embodiment is an apparatus, where the memory comprises a content addressable memory, and where the coherency controller is configured to identify the caching agent cluster that contains the first caching agent by accessing the content addressable memory using an identifier of the first caching agent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. A method comprising:
   programming a plurality of entries of a cluster-to-caching agent (cluster-to-CA) map table in a data processing network having a plurality of caching agents, each entry identifying one or more caching agents in a caching agent cluster;
   storing, in a snoop filter cache of the data processing network, coherency information associated with data moved between one or more caches of the plurality of caching agents and a data storage device shared by the plurality of caching agents, the coherency information for the data including coherency status information and a presence vector identified by an address tag of the data, where a bit position in the presence vector is associated with a caching agent cluster containing one or more caching agents;
   responsive to receiving a message from a caching agent of the plurality of caching agents, the message designating an address in the data storage device:
      accessing a presence vector in the snoop filter cache identified by a first address tag corresponding to the designated address in the data storage device;
      identifying, from the accessed presence vector, one or more caching agent clusters;
      determining, based on the cluster-to-CA map table, a set of target caching agents in the identified one or more caching agent clusters;
      sending snoop messages to the set of target caching agents to maintain data coherency in the data processing network for data associated with the data storage device; and
   responsive to a change in presence, at a first caching agent of the plurality of caching agents, of data associated with an address:
      identifying, based on the address, a line of the snoop filter cache;
      identifying, based on a caching agent-to-cluster (CA-to-cluster) map table, a caching agent cluster that contains the first caching agent, the CA-to-cluster map table identifying, for each caching agent of the plurality of caching agents, a caching agent cluster containing that caching agent; and
      updating a bit in a presence vector of the line associated with the identified caching agent cluster in accordance with the change in presence of the data.

2. The method of claim 1, where one or more of the caching agent clusters in the cluster-to-CA map table includes a single caching agent and one or more of the caching agent clusters in the cluster-to-CA map table includes more than one caching agent.

3. The method of claim 1, where a bit position in the presence vector is associated with a plurality of caching agent clusters and each of the plurality of caching agent clusters is associated with a designated storage region of the data storage device.

4. The method of claim 1, where said determining the set of target caching agents is further based on the address in the data storage device and the set of target caching agents includes only caching agents with access to the address in the data storage.

5. The method of claim 1, further comprising programming a cluster-to-CA map table for each of a plurality of storage regions of the data storage device, where said determining the set of target caching agents includes:

determining a storage region of the data storage device that contains the designated address; and mapping the one or more caching agent clusters to the set of target caching agents using the cluster-to-CA map table for the determined storage region.

6. The method of claim 5, where a caching agent with access to a first storage region of the plurality of storage regions is contained in a caching agent cluster consisting of a single caching agent in a cluster-to-CA map table for the first storage region.

7. A method comprising:

storing, in a snoop filter cache of a data processing network, coherency information associated with data moved between one or more caches of a plurality of caching agents of the data processing network and a data storage device shared by the plurality of caching agents, the coherency information for the data including coherency status information and a presence vector identified by an address tag of the data, where a bit position in the presence vector is associated with a caching agent cluster containing one or more caching agents;

responsive to a change in presence, at a first caching agent of the plurality of caching agents, of data associated with an address:
identifying, based on the address, a line of the snoop filter cache;
identifying, based on a caching agent-to-cluster (CA-to-cluster) map table, a caching agent cluster that contains the first caching agent, the CA-to-cluster map table identifying, for each caching agent of the plurality of caching agents, a caching agent cluster containing that caching agent; and
updating a bit in a presence vector of the line associated with the identified caching agent cluster in accordance with the change in presence of the data.

8. An apparatus comprising:

a coherency controller configured to access a data storage device;

a plurality of caching agents of a data processing network, each caching agent having at least one cache and configured to access the data storage device via the coherency controller;

a memory, accessible by the coherency controller, configured to store a cluster-to-caching agent (cluster-to-CA) map table, each entry in the cluster-to-CA map table identifying one or more caching agents in a caching agent cluster; and a snoop filter cache accessible by the coherency controller, where the coherency controller is configured to:
maintain, in the snoop filter cache, coherency information for data moved between one or more caches of the plurality of caching agents and a data storage device shared by the plurality of caching agents, the coherency information for the data including coherency status information and a presence vector identified by an address tag of the data, where a bit position in the presence vector is associated with a caching agent cluster containing one or more caching agents;
responsive to receiving a message from a caching agent of the plurality of caching agents, the message associated with an address in the data storage device;
access a presence vector in the snoop filter cache identified by a first address tag corresponding to the designated address in the data storage device;
identify, from the accessed presence vector, one or more caching agent clusters;
determine, based on the cluster-to-CA map table, a set of target caching agents in the identified one or more caching agent clusters;
send snoop messages to the set of target caching agents to maintain data coherency in the data processing network for data associated with the data storage device;
responsive to a change in presence, at a first caching agent of the plurality of caching agents, of data associated with an address:
identify, based on the address, a line of the snoop filter cache;
identify, based on a caching agent-to-cluster (CA-to-cluster) map table, a caching agent cluster that contains the first caching agent, the CA-to-cluster map table identifying, for each caching agent of the plurality of caching agents, a caching agent cluster containing that caching agent; and
update a bit in a presence vector of the line associated with the identified caching agent cluster in accordance with the change in presence of the data.

9. The apparatus of claim 8, further comprising the data storage device.

10. The apparatus of claim 8, where the coherency controller and the plurality of caching agents are operatively coupled via a wired or wireless network.

11. The apparatus of claim 8, where a bit position in the presence vector is associated with a plurality of caching agent clusters and each of the plurality of caching agent clusters is associated with a designated storage region of the data storage device.

12. The apparatus of claim 8, where the coherency controller is configured to determine the set of target caching agents based on the address in the data storage device and the set of target caching agents includes only caching agents with access to the address in the data storage.

13. The apparatus of claim 8, where the memory is configured to store a cluster-to-CA map table for each of a plurality of storage regions of the data storage device, where the coherency controller is configured to determine the set of target caching agents by:
determining a storage region of the data storage device that contains the designated address; and
mapping the one or more caching agent clusters to the set of target caching agents using the cluster-to-CA map table for the determined storage region.

14. The apparatus of claim 13, where a caching agent with access to a first storage region of the plurality of storage regions is contained in a caching agent cluster consisting of a single caching agent in a cluster-to-CA map table for the first storage region.

15. The apparatus of claim 8, where the coherency controller is further configured to:
detect a change in presence, at a first caching agent of the plurality of caching agents, of data associated with an address;
identify, based on the address, a line of the snoop filter cache;
identify a caching agent cluster that contains the first caching agent; and
updating a bit in a presence vector of the line associated with the identified caching agent cluster in accordance with the change in presence of the data.

16. The apparatus of claim 8, where the memory comprises a content addressable memory, and where the coherency controller is configured to identify the caching agent cluster that contains the first caching agent by accessing the content addressable memory using an identifier of the first caching agent.

17. The apparatus of claim 8, where the cluster-to-CA map table provides hybrid tracking that includes precise tracking and imprecise tracking.

18. The apparatus of claim 17, where one or more of the caching agent clusters in the cluster-to-CA map table includes a single caching agent to provide precise tracking, and one or more of the caching agent clusters in the cluster-to-CA map table includes more than one caching agent to provide imprecise tracking.

19. The apparatus of claim 18, where said precise tracking reduces snoop message latency.

20. The apparatus of claim 8, where each caching agent cluster includes caching agents located in different memory regions.

* * * * *